(12) United States Patent
Yamada

(10) Patent No.: US 8,395,788 B2
(45) Date of Patent: Mar. 12, 2013

(54) PRINT CONTROL DEVICE, PRINT CONTROL METHOD AND PROGRAM

(75) Inventor: Takafumi Yamada, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1459 days.

(21) Appl. No.: 11/896,819

(22) Filed: Sep. 6, 2007

(65) Prior Publication Data

US 2008/0062460 A1 Mar. 13, 2008

(30) Foreign Application Priority Data

Sep. 8, 2006 (JP) ................................ 2006-244158

(51) Int. Cl.
*G06F 3/12* (2006.01)
(52) U.S. Cl. ...................................................... 358/1.13
(58) Field of Classification Search .................. 358/1.15
See application file for complete search history.

(56) References Cited

U.S. PATENT DOCUMENTS

| | | | | |
|---|---|---|---|---|
| 5,689,699 | A * | 11/1997 | Howell et al. .......................... | 1/1 |
| 6,304,733 | B1 | 10/2001 | Ohira | |
| 2001/0001272 | A1 | 5/2001 | Ohira | |
| 2004/0012802 | A1* | 1/2004 | Allen et al. ................... | 358/1.13 |
| 2006/0089878 | A1* | 4/2006 | Roberts et al. .................. | 705/14 |
| 2006/0119886 | A1* | 6/2006 | Nemoto ........................ | 358/1.15 |
| 2006/0126096 | A1* | 6/2006 | Yasukaga et al. ............ | 358/1.14 |

FOREIGN PATENT DOCUMENTS

| | | |
|---|---|---|
| JP | 5-138997 | 6/1993 |
| JP | 10-837 | 1/1998 |
| JP | 2000-338837 | 12/2000 |
| JP | 2004-299242 | 10/2004 |
| JP | 2006-166156 A | 6/2006 |
| JP | 2006-209286 A | 8/2006 |

OTHER PUBLICATIONS

Japanese Office Action, with English Translation, issued in Japanese Patent Application No. JP 2006-244158, dated Oct. 7, 2008.

* cited by examiner

*Primary Examiner* — Marivelisse Santiago Cordero
*Assistant Examiner* — Mesfin Getaneh
(74) *Attorney, Agent, or Firm* — Banner & Witcoff, Ltd.

(57) ABSTRACT

A print control device for controlling a printing device is provided with a print control unit which controls the printing device to print an image corresponding to print target data on a sheet when the print target data is specified; and a time information acquiring unit which acquires information on a time to be printed on the sheet as an expiration date/time of the printed document. The print control unit is configured to be capable of making the printing device print an image representing the expiration date/time of the printed document on the sheet printed with the image corresponding to the specified print target data based on the information acquired by the time information acquiring unit when the print control unit makes the printing device execute the printing of the image corresponding to the specified print target data.

19 Claims, 8 Drawing Sheets

(PRINT HISTORY TABLE)

| No. | DOCUMENT | USER NAME | PRINT DATE/TIME | EXPIRATION DATE/TIME | STORED FILE | IMPORTANCE |
|---|---|---|---|---|---|---|
| 1 | file1.doc | user1 | 07/01/2006 15:00:00 | 07/05/2006 15:00:00 | file1.prm | 3 |
| 2 | file2.xls | user2 | 07/01/2006 15:25:00 | 07/06/2006 17:00:00 | | 1 |
| 3 | file3.doc | user1 | 07/01/2006 16:15:00 | 07/05/2006 16:15:00 | | 1 |
| 4 | file4.ppt | user3 | 07/02/2006 10:08:00 | 07/04/2006 17:00:00 | file4.prm | 2 |
| 5 | file5.doc | user2 | 07/02/2006 11:50:00 | 07/07/2006 17:00:00 | file5.prm | 3 |
| | | | | | | |
| | | | | | | |
| | | | | | | |

PRINT DATA INFORMATION

| No. | DOCUMENT | USER NAME | PRINT DATE/TIME | EXPIRATION DATE/TIME | STORED FILE | IMPORTANCE |
|---|---|---|---|---|---|---|
| 1 | file1.doc | user1 | 07/01/2006 15:00:00 | 07/05/2006 15:00:00 | file1.prm | 3 |
| 2 | file2.xls | user2 | 07/01/2006 15:25:00 | 07/06/2006 17:00:00 | | 1 |
| 3 | file3.doc | user1 | 07/01/2006 16:15:00 | 07/05/2006 16:15:00 | | 1 |
| 4 | file4.ppt | user3 | 07/02/2006 10:08:00 | 07/04/2006 17:00:00 | file4.prm | 2 |
| 5 | file5.doc | user2 | 07/02/2006 11:50:00 | 07/07/2006 17:00:00 | file5.prm | 3 |
| | | | | | | |
| | | | | | | |
| | | | | | | |

OK   PRINT   PREVIEW

FIG. 9

PRINT CONTROL DEVICE, PRINT CONTROL METHOD AND PROGRAM

CROSS-REFERENCE TO RELATED APPLICATION

This application claims priority from Japanese Patent Application No. 2006-244158, filed on Sep. 8, 2006, the entire subject matter of which is incorporated herein by reference thereto.

BACKGROUND

1. Field of the Invention

The present invention relates to a print control device, a print control method and a program for controlling a printing device to make the printing device print an image corresponding to specified data on a sheet when data as the target of printing is specified.

2. Related Art

In well-known methods for making a printing device (e.g. printer) print user data which has been created by a user by use of an information processing device, the user data is converted into print image data (as image data for printing) using a printer driver corresponding to the printing device, and the print image data obtained by the conversion is supplied to the printing device to make the printing device print an image corresponding to the print image data on a sheet (paper, transparent sheet, etc.). As examples of such print image data, image data describing image information in a page description language (PDL), raster image data, etc. are widely known.

Meanwhile, there exists a printing technique of automatically printing the current date/time on the sheet during the process for printing user data and thereby recording the date/time of the printed document on the sheet, as described in Japanese Patent Provisional Publication No. HEI 05-138997 (hereinafter, referred to as '997 publication).

However, with the progress of office networking in recent years, each printing device is likely to be shared by a plurality of users, and the following problems are arising under such circumstances.

First, when a printing device is shared by two or more users, a printed document (printout) ejected to the output tray of the printing device can be left in the tray for a long time when the user has forgotten to pick up the printed document, for example, and other users not needing the document can be troubled by the document left in the tray.

Specifically, when such a neglected document (sheet) exists in the output tray, documents printed thereafter are stacked on the neglected document. In such cases, each user has to select and pick up his/her own document (sheet) from the stack in the tray.

Second, even when a printed document is left in the output tray for a long time, it is sometimes difficult for other users noticing such a neglected document to take out the document from the tray and discard it, considering that the person needing the document can appear in a while to pick up the document.

As above, when printed documents (printouts) are left in the output tray of a printing device, other users not needing the documents can suffer inconvenience for a long time in picking up their own printed documents from the tray.

Even if the date/time of printing is printed on the sheet as suggested in '997 publication, users other than one who attended to print the document which has been left on the output tray cannot judge whether the document can be discarded.

SUMMARY OF THE INVENTION

The present invention, which has been made in consideration of the above problems, is advantageous in that a print control device, a print control method and a program, capable of eliminating the disadvantages caused by the sharing of one printing device by a plurality of users (specifically, the inconvenience, trouble, etc. caused by a printed document left in the output tray of a printing device for a long time), can be provided.

In accordance with an aspect of the present invention, there is provided a print control device for controlling a printing device, which is provided with a print control unit which makes the printing device print an image corresponding to print target data on a sheet when the print target data is specified; and a time information acquiring unit which acquires information on a time to be printed on the sheet as an expiration date/time of the printed document. The print control unit is configured to be capable of making the printing device print an image representing the expiration date/time of the printed document on the sheet printed with the image corresponding to the specified print target data based on the information acquired by the time information acquiring unit when the print control unit makes the printing device execute the printing of the image corresponding to the specified print target data.

Specifically, the time information acquiring unit may be configured to acquire the information on the time to be printed on the sheet as the expiration date/time of the printed document through a user interface, or from a storage medium storing setting information, etc.

With the above configuration, the printing device is controlled by the print control unit to print the image representing the expiration date/time of the printed document on the sheet together with the image corresponding to the specified print target data. Therefore, the user who performed a print operation (for making the printing device execute the printing process) by operating the print control device is allowed to inform other users about the date/time when the printed document outputted by the printing process becomes unnecessary, via the expiration date/time information printed on the document.

Therefore, by making an agreement among the users sharing the printing device that a printed document that has passed the expiration date/time may be discarded, unnecessary printed documents are prevented from being left in the output tray of the printing device for a long time, by which other users picking up their own printed documents from the tray are prevented from being troubled for a long time by the unnecessary printed documents remaining in the tray. Incidentally, it is noted that a term date/time in this specification is intended to mean a date, a time or both. Thus, the expiration date/time may be the expiration date, the expiration time, or both.

It is desirable that the print control unit be configured to make the printing device print the image representing the expiration date/time of the printed document on each sheet which is printed with the image corresponding to the specified print target data is printed. The print control unit may preferably be configured to make the printing device print the image representing the expiration date/time of the printed document in a peripheral area of the sheet around the image corresponding to the specified print target data, as header information, footer information, etc., or on the back of the sheet (opposite to the surface printed with the image corresponding to the specified print target data).

In accordance with another aspect of the present invention, there is provided a computer-readable record medium storing computer-readable instructions that cause a computer to implement a time information acquiring function of acquiring information on a time to be printed on a sheet as an expiration date/time of a printed document; and a print control function of making a printing device print an image corresponding to print target data on a sheet when the print target data is specified, while making the printing device print an image representing the expiration date/time of the printed document on the sheet printed with the image corresponding to the specified print target data based on the information acquired by the time information acquiring function.

Preferably, the print control function generates print image data, in which the image representing the expiration date/time of the printed document is laid out together with the image corresponding to the specified print target data, based on the information acquired by the time information acquiring function when the print target data is specified, supplies the generated print image data to the printing device, and thereby makes the printing device print an image corresponding to the generated print image data on the sheet.

In accordance with another aspect of the present invention, there is provided a print control method for controlling a printing device, which includes a time information acquiring step of acquiring information on a time to be printed on a sheet as an expiration date/time of a printed document; and a print control step of making the printing device print an image corresponding to print target data on a sheet when the print target data is specified, while making the printing device print an image representing the expiration date/time of the printed document on the sheet printed with the image corresponding to the specified print target data based on the information acquired by the time information acquiring step.

With the above print control method, effects similar to those of the print control devices described above can be achieved.

BRIEF DESCRIPTION OF THE ACCOMPANYING DRAWINGS

FIG. 9 is a screen image showing an example of the composition of a list screen which is displayed on a display unit by the list screen displaying process.

DETAILED DESCRIPTION OF THE EMBODIMENT

Figure 1:
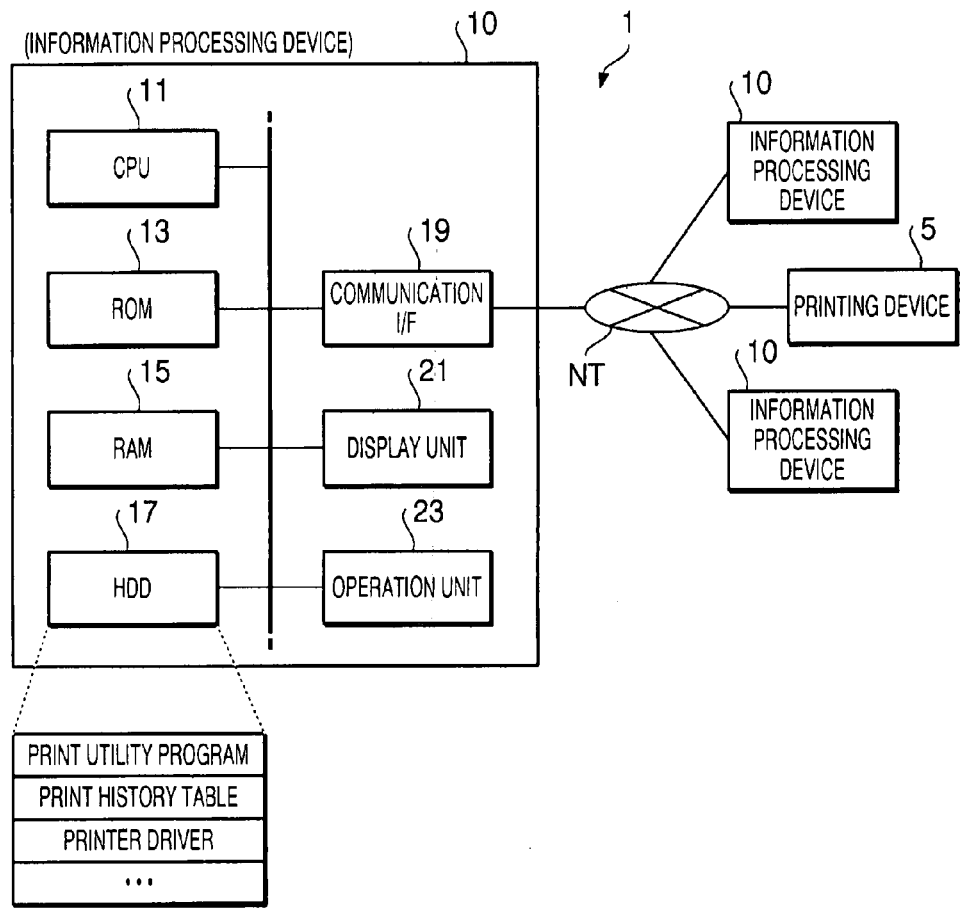
FIG. 1 is a block diagram showing the composition of a printing system 1 in accordance with an embodiment of the present invention.

Referring now to the drawings, a description will be given in detail of a preferred embodiment in accordance with the present invention. FIG. 1 is a block diagram showing the composition of a printing system 1 in accordance with an embodiment of the present invention.

The printing system 1 of this embodiment includes a printing device 5 and a plurality of information processing devices 10 which are connected to a network NT. The printing device 5 in the printing system 1 is configured like a well-known network printer to be able to communicate with each information processing device 10 via the network NT. Specifically, when print image data transmitted from an information processing device 10 is received via the network NT, the printing device 5 prints an image corresponding to the received print image data on a sheet (paper, transparent sheet, etc.) by controlling its own built-in printing unit (unshown) according to a prescribed printing method (ink-jet printing, laser printing, etc.).

Meanwhile, each information processing device 10 has a hardware configuration similar to that of a well-known personal computer. As shown in FIG. 1, the information processing device 10 includes a CPU (Central Processing Unit) 11 for performing various computations, a ROM (Read Only Memory) 13 storing a boot program, etc., a RAM (Random Access Memory) 15 to be used as work areas during program execution by the CPU 11, an HDD (Hard Disk Drive) 17 storing various programs to be executed by the CPU 11, user data, etc., a communication interface 19 capable of bidirectional communication with each device on the network NT, a display unit 21 (LCD, etc.) for displaying information, and an operation unit 23 (keyboard, pointing device, etc.) for receiving user operations.

Each information processing device 10 has the function of executing a printing process by properly controlling the printing device 5, for various user data created by the user by use of a variety of application software (word processing software, document preparation software, spreadsheet software, etc.). This function is implemented by the CPU 11 by executing a print utility program and a printer driver stored in the HDD 17.

Figure 2:
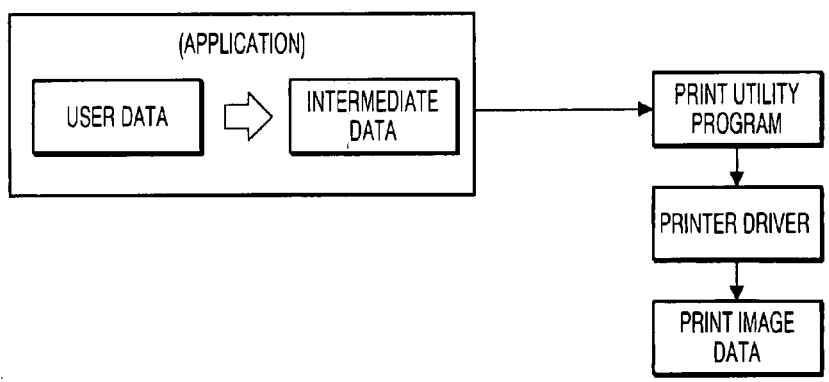
FIG. 2 is a block diagram for explaining the overall flow of a process executed by an information processing device for converting user data into print image data which can be processed by a printing device.

FIG. 2 is a block diagram for explaining the overall flow of a process executed by the information processing device 10 for converting the user data into print image data which can be processed by the printing device 5, together with programs engaged in the process. In this embodiment, when a "print operation" is performed by a user of an information processing device 10 (by performing an operation on a display screen of certain application software currently displayed on the display unit 21) when a piece of user data has already been opened by the application software, the application software recognizes that the opened user data has been specified by the user as print target data and converts the user data into intermediate data (data that can be interpreted by the printer driver) as shown in FIG. 2.

In this embodiment, the print utility program (as a resident program) monitors the user's print operation on each piece of application software. In the above case where the print operation is performed by the user on certain application software, the print utility program converts the intermediate data (generated by the application software as above) into the print image data (processable by the printing device 5) in cooperation with the printer driver. Incidentally, the print image data can be data describing image information on the print target in a page description language (PDL), raster image data, etc.

The print utility program in this embodiment has a special function of adding header information (indicating the expiration date/time, etc. of the printed document) to the print image data as needed and making the printing device 5 print the print image data including the header information. In this embodiment, this function serves to prevent the printed documents (sheets that have been printed on by the printing device 5) from being left in the output tray of the printing device 5 for a long time.

Figure 3:
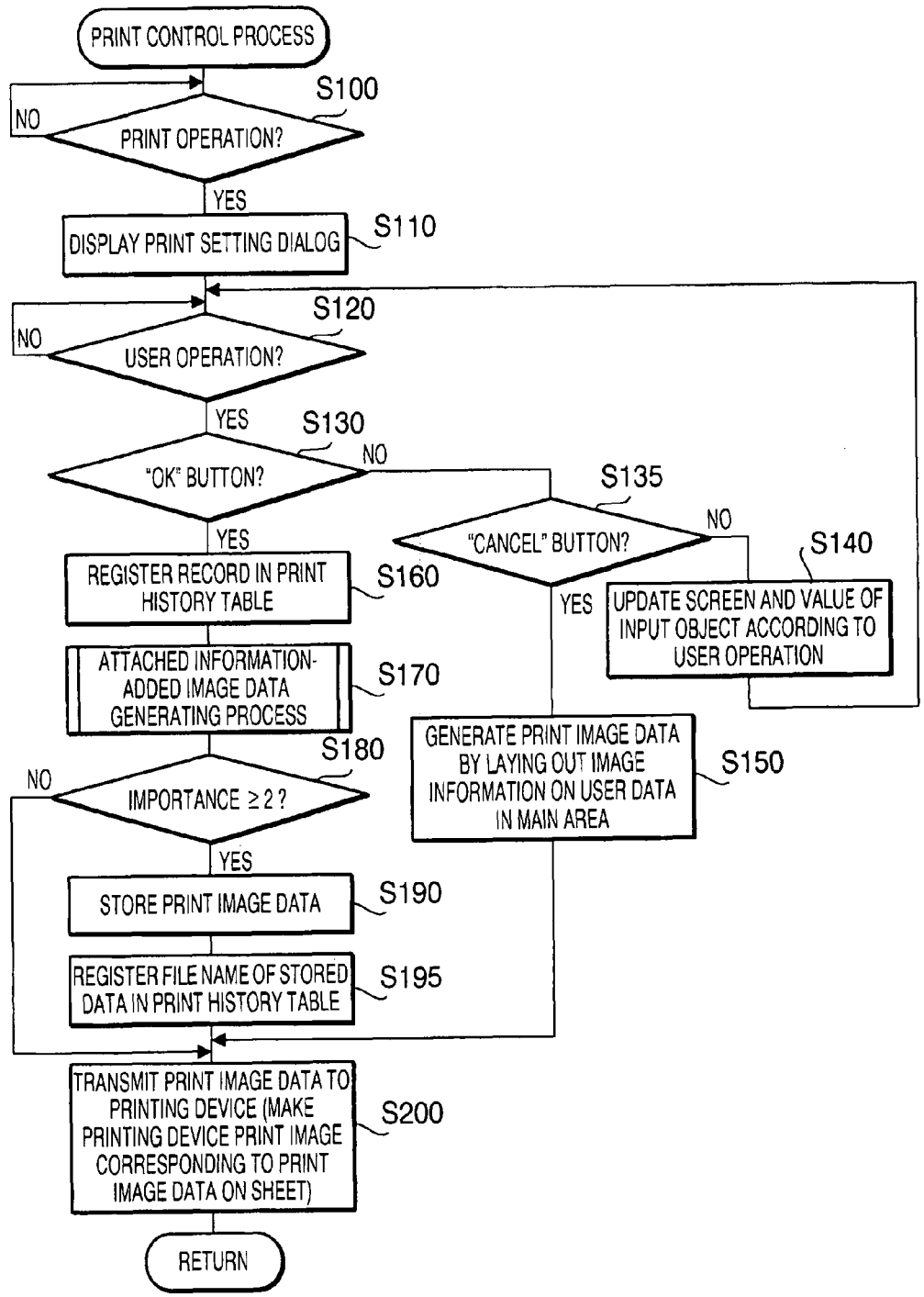
FIG. 3 is a flow chart showing a print control process which is repeatedly executed by a CPU of the information processing device according to a print utility program.

In the following, the function implemented by the print utility program will be explained in detail. FIG. 3 is a flow chart showing a print control process which is repeatedly executed by the CPU 11 of the information processing device 10 according to the print utility program.

At the start of the print control process, the CPU 11 judges whether the print operation has been performed by the user on an already-activated application software or not (S100). If the print operation has been performed (S100: YES), the CPU 11 displays a print setting dialog shown in FIG. 4 on the display unit 21 (S110), otherwise (S100: NO) the CPU 11 waits until the print operation is performed.

Figures 4, 5:
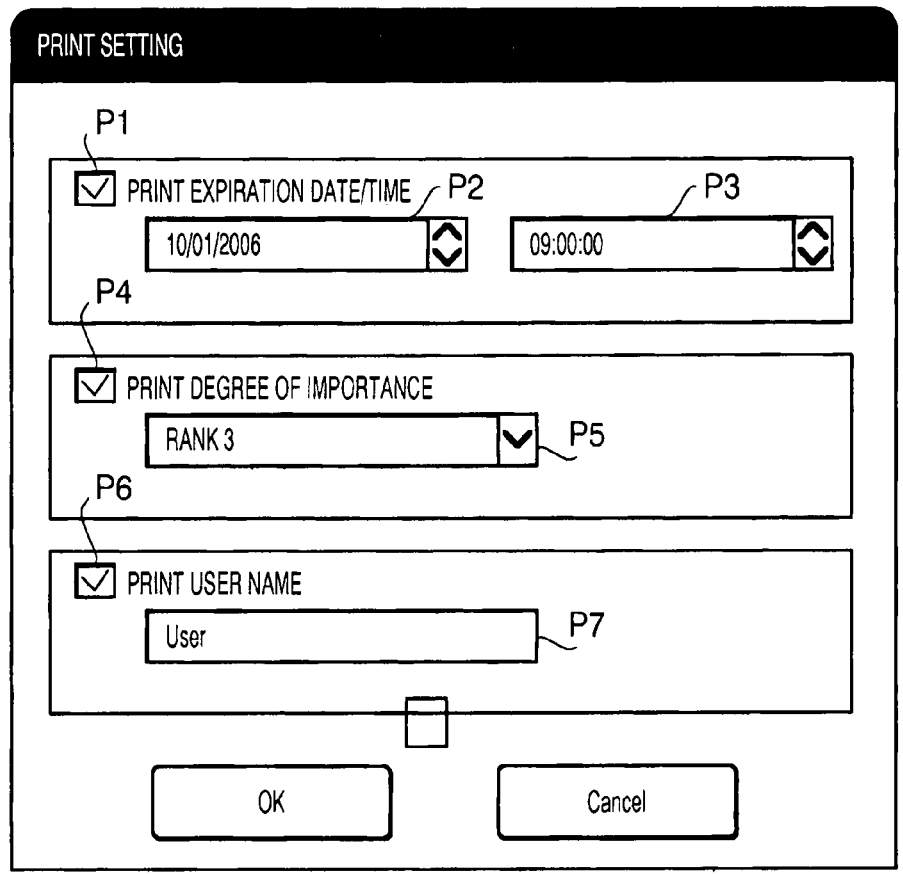
FIG. 4 is a screen image showing an example of the composition of a print setting dialog.
FIG. 5 is a table showing an example of the composition of a print history table.

FIG. 4 is a screen image showing an example of the composition of the print setting dialog. The print setting dialog displayed in S110 is configured as a GUI (Graphical User Interface) screen capable of receiving the user's print setting operation (regarding expiration date/time information, importance information and user name information) through the operation unit 23.

The print setting dialog includes an input object (check box) P1 for receiving a user operation for switching (selecting) whether the printing of the expiration date/time information is necessary or not, input objects P2 and P3 for receiving a user operation for inputting the expiration date/time, an input object (check box) P4 for receiving a user operation for switching (selecting) whether the printing of the importance information is necessary or not, an input object (pull-down menu) P5 for receiving a user operation for inputting (selecting) the degree of importance, an input object (check box) P6 for receiving a user operation for switching (selecting) whether the printing of the user name information is necessary or not, and an input object P7 for receiving a user operation for inputting the user name.

Specifically, in the step S110, the input objects P1, P4 and P6 are initially displayed in the checked state, and a date/time that is a prescribed time period after the current date/time is displayed in the input objects P2 and P3 as the initial value of the expiration date/time. In the input object P5, a character string "rank 3" is displayed as the initial value of the degree of importance. In the input object P7, the login name of the user who has currently logged in is displayed as the initial value of the user name.

After displaying the print setting dialog on the display unit 21 as above, the CPU 11 waits until a user operation is performed on the print setting dialog (S120). Upon reception of a user operation on the print setting dialog (S120: YES), the CPU 11 judges whether or not the user operation was the pressing of an "OK" button on the print setting dialog (S130). If the user operation was the pressing of the "OK" button (S130: YES), the CPU 11 advances to step S160, otherwise (S130: NO) the CPU 11 advances to step S135.

In the step S135, the CPU 11 judges whether or not the user operation was the pressing of a "CANCEL" button on the print setting dialog. If the user operation was the pressing of the "CANCEL" button (S135: YES), the CPU 11 advances to step S150, otherwise (S135: NO) the CPU 11 advances to step S140.

In the step S140, the CPU 11 executes a process (other process) corresponding to the user operation performed in S100. Specifically, when the user operation was performed on one of the input objects P1-P7, the CPU 11 changes the display status of the input object (P1-P7) to a status corresponding to the user operation, while also changing the value of the input object (P1-P7) stored in the RAM 15 to a value corresponding to the user operation.

For example, when the user operation was performed on the input object (check box) P1, P4 or P6, the CPU 11 switches the state of the check box between the checked state and the non-checked state while also updating the value of the input object P1, P4 or P6 stored in the RAM 15. When the user operation was performed on the input object P2 or P3, the CPU 11 changes the date or time displayed in the input object P2 or P3 according to the user operation while also updating the value of the input object P2 or P6 stored in the RAM 15.

When the user operation was performed on the input object P5, the CPU 11 displays the pull-down menu, lets the user make a selection from the options (degrees of importance) in the pull-down menu, closes the pull-down menu when an option is selected by the user, displays the character string of the selected option in the input object P5, and changes the value of the input object P5 (stored in the RAM 15) to the value corresponding to the selected option. Incidentally, three options: "RANK 1", "RANK 2" and "RANK 3" are displayed in the pull-down menu of the input object P5 in this embodiment.

When the user operation was performed on the input object P7, the CPU 11 displays the inputted character string (user name) in the input object P7 and changes the value of the input object P7 (stored in the RAM 15) to the inputted value (user name).

After finishing the step S140, the CPU 11 returns to the step S120 and waits for a new user operation on the print setting dialog.

In the step S150, the CPU 11 acquires intermediate data (corresponding to the user data as the target of the print operation) from the application software, and converts the acquired intermediate data into print image data by use of the printer driver of the printing device 5 which has previously been registered as a destination printing device (printing device for receiving the print image data and executing the printing), by which the print image data (for making the destination printing device 5 print out the image corresponding to the user data) is obtained.

Specifically, the CPU 11 in S1150 generates the print image data by laying out image information corresponding to the user data in a main area of a page (see FIG. 7). The print image data for making the printing device 5 print out the user data is generated in S150 as above by use of the printer driver.

After finishing the step S150, the CPU 11 advances to step S200 and transmits the generated print image data to the printing device 5 on the network NT via the communication interface 19 so as to make the printing device 5 print the image corresponding to the print image data on a sheet. After finishing the step S200, the CPU 11 ends the currently executed print control process and returns to the step S1100 to repeat the print control process.

Meanwhile, in the step S160 which is executed when the "OK" button on the print setting dialog is pressed, the CPU 11 registers a record indicating a print history regarding the print target user data in a print history table (stored in the HDD 17) previously to the execution of the printing, based on information inputted through the print setting dialog, etc. FIG. 5 is a table showing an example of the composition of the print history table.

As shown in FIG. 5, each record of the print history table includes file name information on a piece of user data (document) which has been printed out, the user name information which has been set through the print setting dialog, print date/time information indicating the date and time of the printing of the document, the expiration date/time information which has been set through the print setting dialog, file name information on the print image data which has been stored as a file, and the importance information which has been set through the print setting dialog.

Specifically, the CPU 11 in S160 first adds a new record (empty record) to the print history table, acquires the file name information on the user data as the target of the print operation from the application software, and writes the acquired file name information into the user data file name information field ("DOCUMENT" field) of the added record, while also writing the current date/time acquired from the system clock (unshown) into the print date/time information field of the added record.

The CPU 11 further writes the expiration date/time (which has been specified in the input objects P2 and P3 of the print setting dialog) in the expiration date/time information field of the added record as the expiration date/time information, writes the value regarding the rank (which has been specified in the input object P5 of the print setting dialog) in the importance information field of the added record as the importance information, and writes the user name (which has been specified in the input object P7 of the print setting dialog) in the user name information field of the added record as the user name information.

Figure 6:
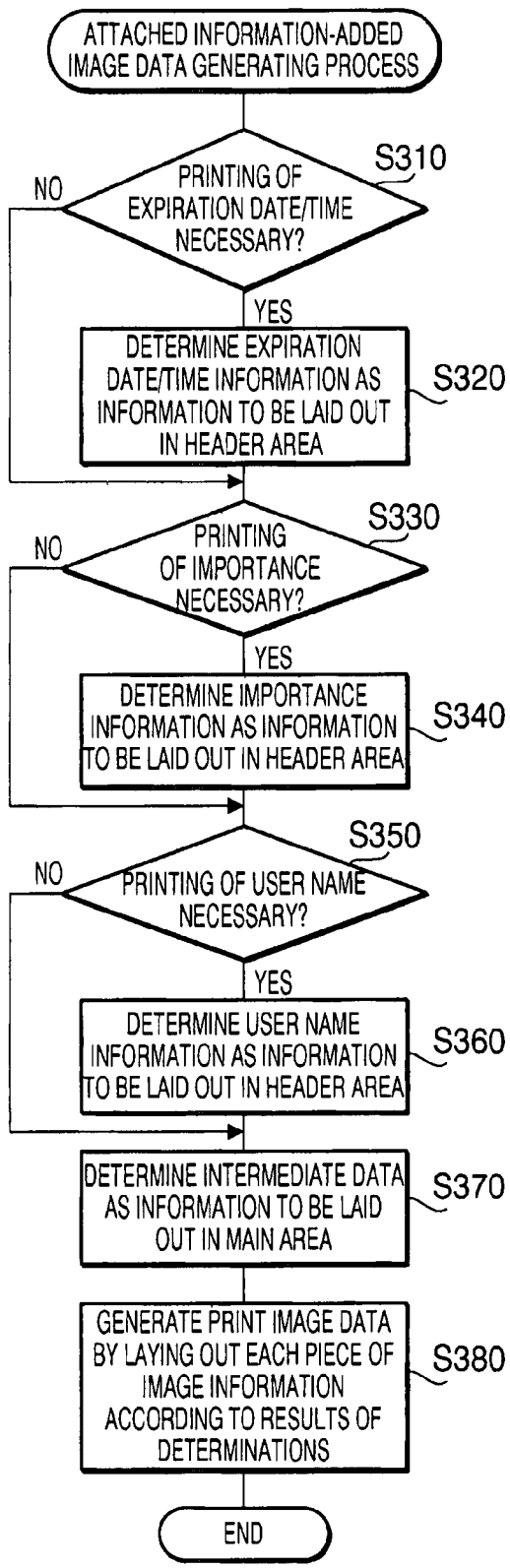
FIG. 6 is a flow chart showing an attached information-added image data generating process which is executed by the CPU of the information processing device.

After finishing the step S160 as above, the CPU 11 advances to step S170 and executes an "attached information-added image data generating process" shown in FIG. 6. FIG. 6 is a flow chart showing the attached information-added image data generating process executed by the CPU 11.

At the start of the attached information-added image data generating process, the CPU 11 judges whether the user has specified that the printing of the expiration date/time information is necessary or not based on the value of the input object P1 (S310). If the printing of the expiration date/time information has been specified to be necessary (S310: YES), the CPU 11 determines a character string "EXPIRATION DATE/TIME" followed by the expiration date/time actually specified in the input objects P2 and P3 of the print setting dialog as information to be laid out in a header area of the page (see FIG. 7) as the expiration date/time information (S320), and thereafter advances to step S330.

On the other hand, if the printing of the expiration date/time information has not been specified to be necessary (S310: NO), the CPU 11 advances to the step S330 without executing the step S320.

In the step S330, the CPU 11 judges whether the user has specified that the printing of the importance information is necessary or not based on the value of the input object P4. If the printing of the importance information has been specified to be necessary (S330: YES), the CPU 11 determines a character string "DEGREE OF IMPORTANCE" followed by the rank (degree of importance) actually specified in the input object P5 of the print setting dialog as information to be laid out in the header area of the page as the importance information (S340). Incidentally, when the expiration date/time information has already been determined as information to be laid out in the header area in S320, the importance information is added to the information to be laid out in the header area. Thereafter, the CPU 11 advances to step S350.

On the other hand, if the printing of the importance information has not been specified to be necessary (S330: NO), the CPU 11 advances to the step S350 without executing the step S340.

In the step S350, the CPU 11 judges whether the user has specified that the printing of the user name information is necessary or not based on the value of the input object P6. If the printing of the user name information has been specified to be necessary (S350: YES), the CPU 11 determines the user name (character string which has been specified in the input object P7 of the print setting dialog) as information to be laid out in the header area of the page as the user name information (S360).

Incidentally, when the expiration date/time information and/or the importance information has already been determined as information to be laid out in the header area in S320 and/or S340, the user name information is added to the information to be laid out in the header area. Thereafter, the CPU 11 advances to step S370.

On the other hand, if the printing of the user name information has not been specified to be necessary (S350: NO), the CPU 11 advances to the step S370 without executing the step S360.

In the step S370, the CPU 11 determines the image information corresponding to the user data (as the target of the print operation) as information to be laid out in the main area of the page (see FIG. 7). In the next step S380, the CPU 11 generates the print image data by successively laying out the above pieces of information in the main area and the header area of the page according to the results of the steps S310-S370.

Figure 7A:
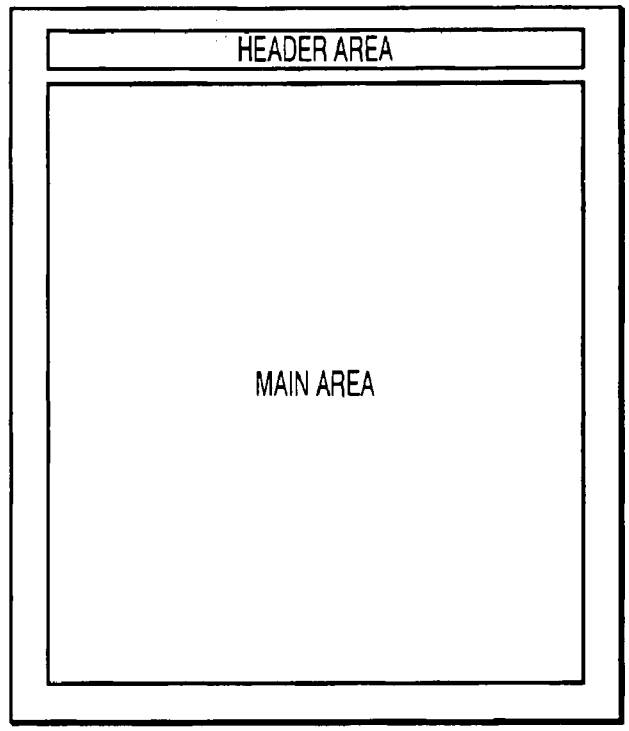
FIG. 7A is a schematic diagram for explaining a main area and a header area of a page (sheet).
Figure 7B:
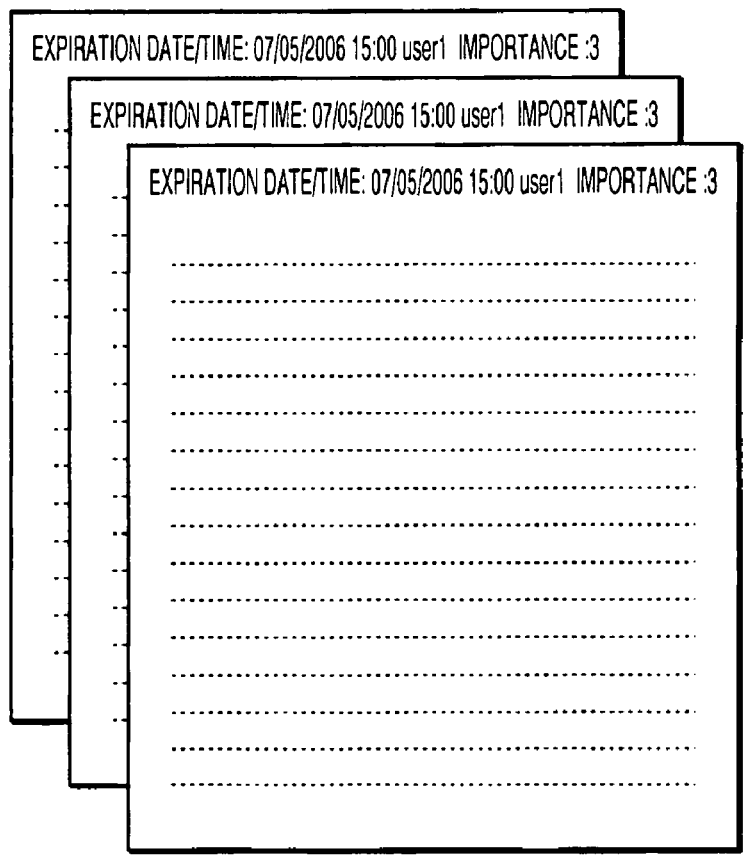
FIG. 7B is a schematic diagram for explaining the composition of print image data in which expiration date/time information, importance information and user name information are laid out in the header area.

Specifically, the CPU 11 in S380 generates print image data having the layout shown in FIG. 7B by acquiring the intermediate data (corresponding to the user data as the target of the print operation) from the application software, laying out image information corresponding to the acquired intermediate data in the main area of the page (see FIG. 7), and successively laying out character string image information corresponding to each piece of attached information (expiration date/time information, importance information, user name information) in the header area of the page as needed according to the results of the steps S320, S340 and S360.

Incidentally, FIG. 7A is a schematic diagram for explaining the main area and the header area of a page (sheet), and FIG. 7B is a schematic diagram for explaining the composition of the print image data in which the expiration date/time information, the importance information and the user name information are laid out in the header area.

Specifically, the CPU 11 in S380 generates the print image data for making the printing device 5 execute the printing, by use of the printer driver of the printing device 5 which has previously been registered as the destination printing device (printing device for receiving the print image data and executing the printing). Thereafter, the CPU 11 ends the attached information-added image data generating process.

After finishing the attached information-added image data generating process (S170 in FIG. 3) as above, the CPU 11 advances to step S180 in FIG. 3 and judges whether or not the degree of importance which has been set through the input object P5 of the print setting dialog is 2 or more, that is, whether or not the rank selected from the input object P5 is "RANK 2" or "RANK 3".

If the degree of importance is 2 or more (S180: YES), the CPU 11 stores the print image data generated in S170 in a prescribed directory of the HDD 17 (S190), writes the file name information on the stored print image data in the print image data file name information field ("STORED FILE" field) of the added record of the print history table (S195), and advances to the step S200. On the other hand, if the degree of importance is less than 2 (S180: NO), the CPU 11 advances to the step S200 without executing the steps S190-S195.

In the step S200, the CPU 11 transmits the generated print image data to the printing device 5 on the network NT via the communication interface 19 and thereby makes the printing device 5 print the image corresponding to the print image data on a sheet. After finishing the step S200, the CPU 11 ends the currently executed print control process and returns to the step S100 to repeat the print control process.

As described above, the information processing device 10 in this embodiment adds the attached information (the expiration date/time, etc. of the printed document) to the print image data as the header information as needed (according to the settings made on the print setting dialog) and makes the printing device 5 print out the print image data including the header information.

In this embodiment, the print utility program has a function of displaying a list of print history of previously-printed data (data that have been printed out so far) based on the information registered in the print history table and making the printing device 5 reprint a piece of print image data which has been stored in the prescribed directory of the HDD 17 in S190 according to a "reprint operation" by the user. This function will be explained below referring to FIGS. 8 and 9.

Figure 8:
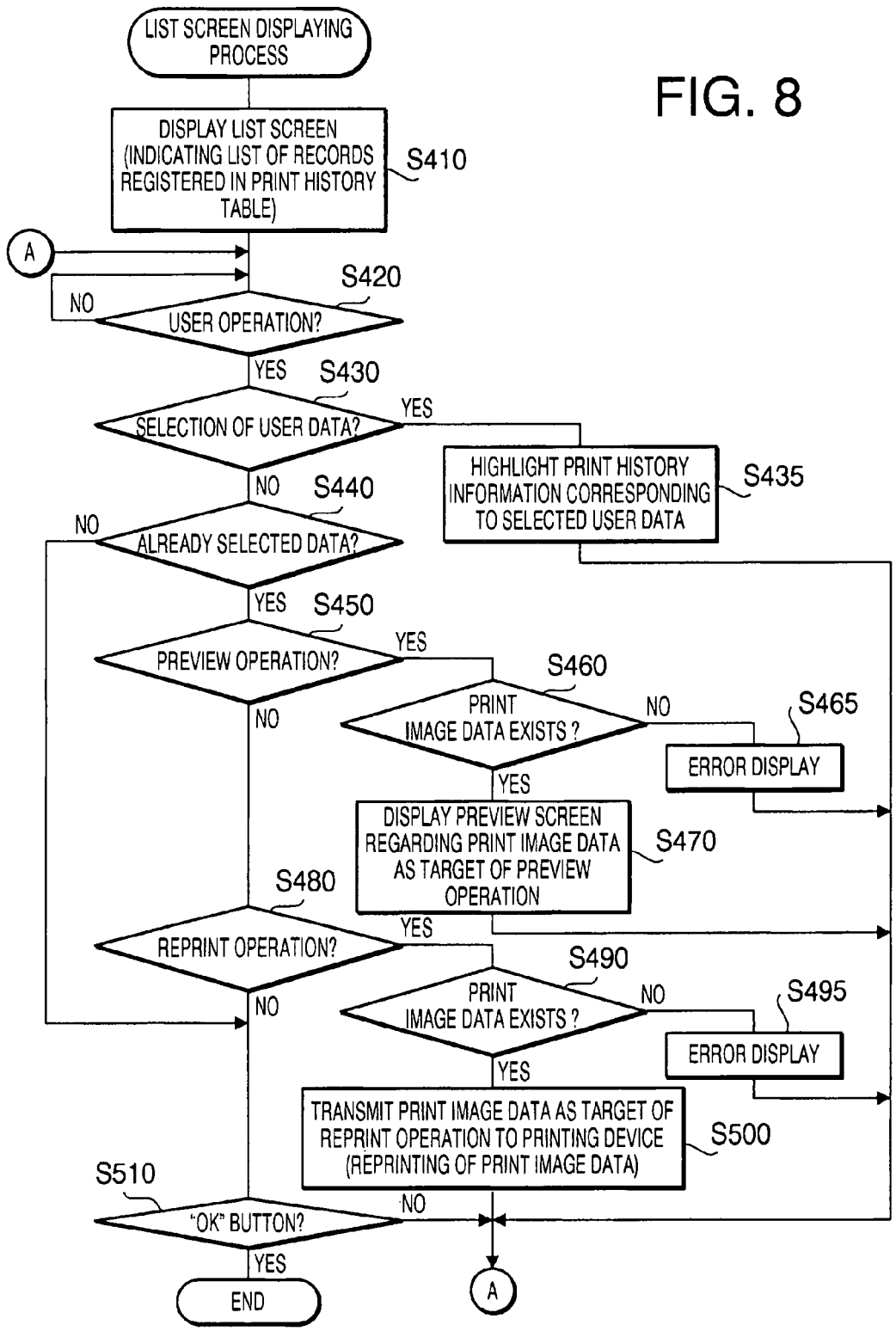
FIG. 8 is a flow chart showing a list screen displaying process which is executed by the CPU of the information processing device.

FIG. 8 is a flow chart showing a list screen displaying process which is executed by the CPU 11 according to the print utility program when a list screen display instruction is inputted by the user to an (unshown) operation screen (currently displayed on the display unit 21 by the print utility program) through the operation unit 23. FIG. 9 is a screen image showing an example of the composition of the list screen (GUI) which is displayed on the display unit 21 by the list screen displaying process.

At the start of the list screen displaying process, the CPU 11 displays the list screen shown in FIG. 9 (indicating a list of user data which have been printed out so far) on the display unit 21 based on the information registered in the print history table (S410).

The list screen is a screen for showing print history information (including the user data file name information, the user name information, the print date/time information, the expiration date/time information and the importance information) regarding each record of the print history table. The list screen further includes a "PRINT" button for receiving the user's "reprint operation" regarding each piece of user data, a "PREVIEW" button for receiving the user's "preview operation" regarding each piece of user data, and an "OK" button for receiving a user operation for closing the list screen.

After displaying the list screen configured as above in S410, the CPU 11 waits until a user operation is performed on the list screen through the operation unit 23 (S420). Upon reception of a user operation on the list screen (S420: YES), the CPU 11 judges whether or not the user operation was a selection of a piece of user data (S430). In this step, when one of the records (lines of print history information regarding multiple pieces of user data) listed on the list screen is clicked on by the user, the CPU 11 judges that a piece of user data corresponding to the clicked record (print history information) has been selected.

If the user operation was a selection of user data (S430: YES), the CPU 11 highlights the selected record (print history information) (S435) and thereafter returns to the step S420. Incidentally, when another record has already been highlighted in S435, the CPU 11 restores the record to the non-highlighted state while highlighting the selected record (print history information).

On the other hand, if the user operation was not a selection of user data (S430: NO), the CPU 11 judges whether or not there exists user data that has already been selected (S440). If a piece of user data has already been selected (S440: YES), the CPU 11 advances to step S450, otherwise (S440: NO) the CPU 11 advances to step S510.

In the step S450, the CPU 11 judges whether the user operation was the preview operation or not. In this step, when the "PREVIEW" button is pressed by the user with a record (a piece of user data) already selected on the list screen, the CPU 11 judges that the preview operation has been performed in regard to the selected user data.

If the user operation was the preview operation (S450: YES), the CPU 11 judges whether print image data corresponding to the selected user data has been stored in the HDD 17 or not (S460). Specifically, the CPU 11 in S460 identifies the print image data corresponding to the selected user data based on the record of the print history table corresponding to the selected user data and checks whether or not the identified print image data exists in the prescribed directory of the HDD 17. Incidentally, when the print image data file name information field ("STORED FILE" field) of the record is empty, the CPU 11 judges that the print image data corresponding to the selected user data has not been stored in the HDD 17.

If the print image data corresponding to the selected user data has not been stored in the HDD 17 (S460: NO), the CPU 11 displays an error screen (indicating that there exists no corresponding data) on the display unit 21 (S465) and thereafter returns to the step S420.

On the other hand, if the print image data corresponding to the selected user data has been stored in the HDD 17 (S460: YES), the CPU 11 reads out the print image data corresponding to the selected user data from the HDD 17 and displays a preview screen (showing a print image of the print image data) on the display unit 21 (S470). Thereafter, the CPU 11 returns to the step S420.

If the user operation was not the preview operation in S450 (S450: NO), the CPU 11 judges whether the user operation was the reprint operation or not (S480). In this step, when the "PRINT" button on the list screen is pressed by the user with a record (a piece of user data) already selected on the list screen, the CPU 11 judges that the reprint operation has been performed in regard to the selected user data.

If the user operation was the reprint operation (S480: YES), the CPU 11 judges whether the print image data corresponding to the selected user data has been stored in the HDD 17 or not (S490) similarly to the judgment of S460. Specifically, the CPU 11 in S490 identifies the print image data corresponding to the selected user data based on the record of the print history table corresponding to the selected user data and checks whether the identified print image data exists in the prescribed directory of the HDD 17.

If the print image data corresponding to the selected user data has not been stored in the HDD 17 (S490: NO), the CPU 11 displays an error screen (indicating that there exists no corresponding data) on the display unit 21 (S495) and thereafter returns to the step S420.

On the other hand, if the print image data corresponding to the selected user data has been stored in the HDD 17 (S490: YES), the CPU 11 reads out the print image data corresponding to the selected user data from the HDD 17 and transmits the print image data to the previously registered destination printing device 5 via the communication interface 19 so as to make the printing device 5 print (reprint) an image corresponding to the user data as the target of the reprint operation (i.e. an image according to the print image data) on a sheet. Thereafter, the CPU 11 returns to the step S420.

If the user operation was not the reprint operation in S480 (S480: NO), the CPU 11 judges whether the user operation was the pressing of the "OK" button or not (S510). If the user operation was the pressing of the "OK" button (S510: YES), the CPU 11 ends the list screen displaying process, otherwise (S510: NO) the CPU 11 returns to the step S420.

Figure 10:
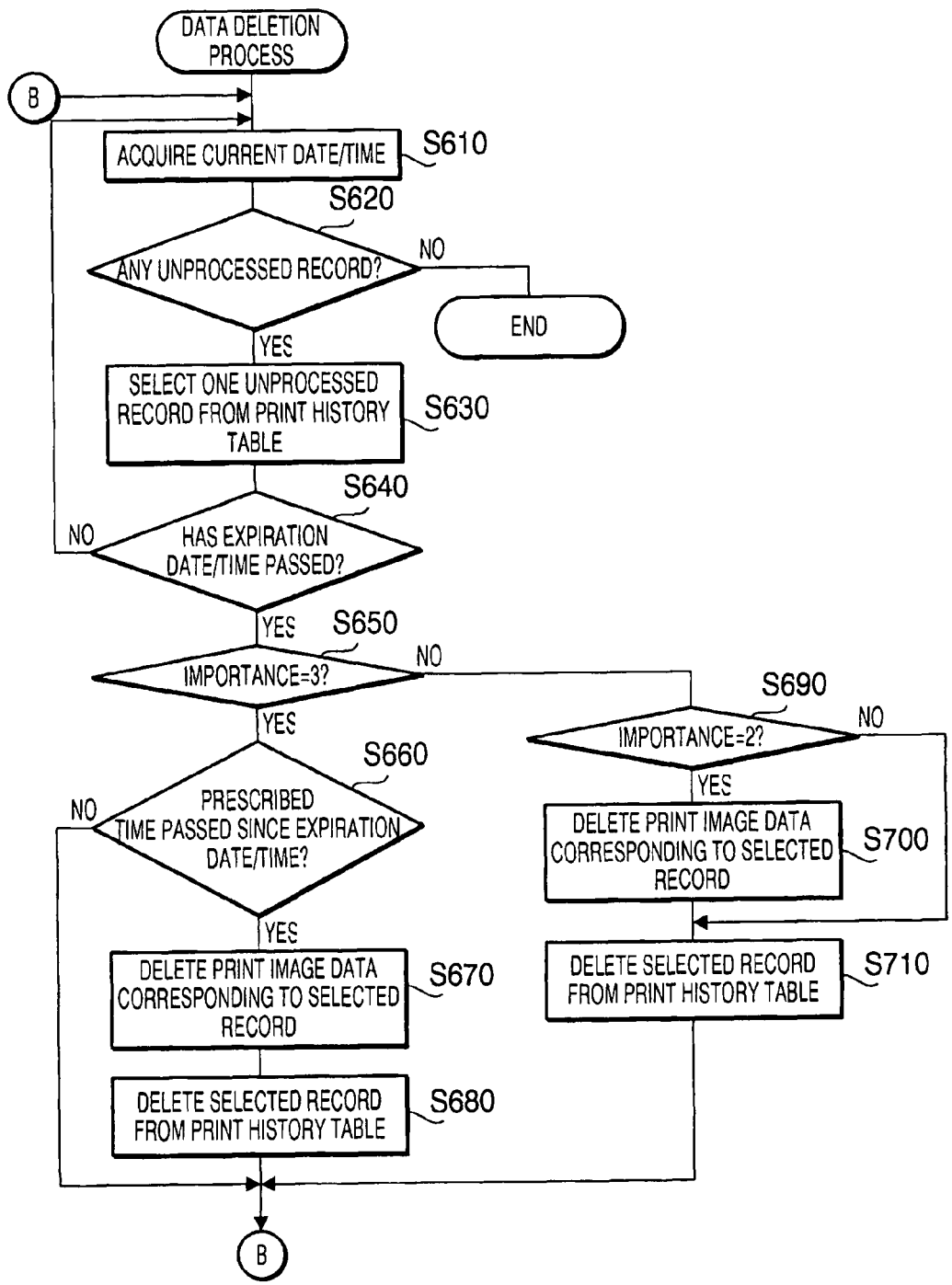
FIG. 10 is a flow chart showing a data deletion process which is executed by the CPU of the information processing device.

The print utility program in this embodiment further has a function of automatically deleting old records from the records registered in the print history table while automatically deleting print image data from the HDD 17 according to prescribed conditions. This function is implemented by the CPU 11 by executing a data deletion process shown in FIG. 10. FIG. 10 is a flow chart showing the data deletion process which is executed by the CPU 11 according to the print utility program. The data deletion process of FIG. 10 is executed repeatedly on a periodic basis.

At the start of the data deletion process, the CPU 11 acquires the current date and time from the system clock (S610). Subsequently, the CPU 11 judges whether the records registered in the print history table include a record that has not been processed by step S640 yet (S620). In other words, the CPU 11 in S620 judges whether there exists an unprocessed record (that has not been processed in S640 of the currently executed data deletion process) in the print history table.

If there exists no unprocessed record (S620: NO), the CPU 11 ends the data deletion process. If there exists an unprocessed record (S620: YES), the CPU 11 selects an unprocessed record from the records registered in the print history table (S630) and judges whether the current date/time is after the expiration date/time of the selected record or not based on the expiration date/time information included in the selected record (S640).

If the current date/time is not after the expiration date/time (S640: NO), the CPU 11 returns to the step S610. If the current date/time is after the expiration date/time (S640: YES), the CPU 11 judges whether the degree of importance specified by the selected record is 3 or not based on the importance information included in the selected record (S650).

If the degree of importance in the selected record is 3 (S650: YES), the CPU 11 judges whether or not a prescribed time period (e.g. 1 day) has passed since the expiration date/time specified by the selected record (S660). If the prescribed time period has not passed (S660: NO), the CPU 11 returns to the step S610. If the prescribed time period has passed since the expiration date/time (S660: YES), the CPU 11 deletes the print image data corresponding to the selected record from the HDD 17 based on the print image data file name information included in the selected record (S670) and deletes the selected record from the print history table (S680). Thereafter, the CPU 11 returns to the step S610.

If the degree of importance in the selected record is not 3 in S650 (S650: YES), the CPU 11 judges whether the degree of importance in the selected record is 2 or not (S690).

If the degree of importance in the selected record is 2 (S690: YES), the CPU 11 deletes the print image data corresponding to the selected record from the HDD 17 based on the print image data file name information included in the selected record (S700) and deletes the selected record from the print history table (S710). Thereafter, the CPU 11 returns to the step S610.

If the degree of importance in the selected record is not 2 in S690 (S690: NO), the CPU 11 directly advances to the step S710 and deletes the selected record from the print history table, without executing the step S700. The step S700 is skipped in this case since print image data whose degree of importance is 1 has not been stored in the HDD 17 (S180: NO). Thereafter, the CPU 11 returns to the step S610.

When the process from S640 has been finished for all the records registered in the print history table, the judgment of S620 results in "NO" and the CPU 11 ends the data deletion process. Thereafter, the CPU 11 executes the data deletion process again when a prescribed time period has passed, by which the automatic deletion of old print image data from the HDD 17 and the automatic deletion of old records from the print history table based on the degree of importance specified in each record are executed on a periodic basis.

As described above, in the printing system 1 in accordance with the embodiment of the present invention, each information processing device 10 acquires the expiration date/time information (the expiration date/time of the printed document to be printed on the sheet) via a user interface (operation unit 23) and attaches the expiration date/time information as the header information to the print image data which is supplied to the printing device 5, by which the character string image representing the expiration date/time of the printed document is printed by the printing device 5 on each sheet printed with the image corresponding to the user data.

Specifically, the print image data in this embodiment is generated by laying out the image corresponding to the print target user data (as the target of the print operation) in the central part (main area) of each page while laying out the character string image representing the expiration date/time of the printed document in the peripheral part (header area) of each page on which the image corresponding to the user data is laid out. The generated print image data is supplied to the printing device 5 to make the printing device 5 print the character string image representing the expiration date/time of the printed document on each sheet (page) printed with the image corresponding to the user data.

Thus, by this embodiment, the user performing the print operation on an information processing device 10 (to make the printing device 5 execute a printing process) is allowed to inform other users about the date/time when the printed document outputted by the printing process becomes unnecessary, via the expiration date/time information printed on the document.

Therefore, by making an agreement among the users sharing the printing device 5 that a printed document that has passed the expiration date/time may be discarded, unnecessary printed documents are prevented from being left in the output tray of the printing device 5 for a long time, by which users picking up their own printed documents from the output tray are prevented from being troubled for a long time by the unnecessary printed documents remaining in the output tray.

Further, in this embodiment, each piece of print image data corresponding to user data whose degree of importance has been set at 2 or more is stored in the HDD 17 when the print image data is generated, and the list screen (capable of receiving the user's reprint operation requesting the reprinting of a piece of print image data stored in the HDD 17) is displayed according to an instruction of the user. When the reprint operation is performed on the list screen through the operation unit 23, the print image data as the target of the reprint operation is read out from the HDD 17 and transmitted to the printing device 5 to make the printing device 5 print (reprint) an image corresponding to the print image data on a sheet.

Therefore, a printing system 1 especially convenient for the user, allowing the user to easily order the printing device 5 to execute the reprinting of previously-printed data (data that has once been printed out by the printing device 5) through the list screen, can be provided by this embodiment. Especially when the printing device 5 is shared by two or more users, a user can erroneously take out other user's printed document (printout) from the output tray of the printing device 5. With the information processing device 10 in this embodiment having the reprint function, a printed document that has been taken away by another user can be obtained again from the printing device 5 with ease.

The list screen in this embodiment is configured to be capable of receiving the user's preview operation for each piece of print image data. When the preview operation is performed on the list screen, a preview screen corresponding to a piece of print image data as the target of the preview operation is displayed on the display unit 21. Therefore, the user can previously check the contents (image) of the print image data on the preview screen before performing the reprint operation, by which the user is prevented from erroneously activating the reprint process for unintended data.

The information processing device 10 in this embodiment is configured to determine whether to store each piece of print image data (generated from user data) in the HDD 17 or not based on the degree of importance of the user data which has been specified through the print setting dialog. Specifically, the information processing device 10 stores the generated print image data in the HDD 17 only when the degree of importance is 2 or more. Therefore, a printing system 1 allowing the user to easily perform the reprint operation regarding printed documents of high importance can be realized by this embodiment while reducing the required HDD capacity and the required cost.

The print image data in this embodiment is generated by laying out the character string image representing the expiration date/time and the degree of importance of the printed document on each page together with the image corresponding to the user data. By inputting such print image data to the printing device 5, the expiration date/time and the degree of importance can be printed on each sheet (page) printed with the image corresponding to the user data. Thus, this embodiment realizes the printing of user data in a style allowing users to manage the printed documents with ease. The printing system 1 of this embodiment is especially convenient for the user since the user can previously and easily recognize whether the reprint operation on the list screen is possible or not by checking the degree of importance printed on the document.

Further, the information processing device 10 in this embodiment is basically configured to automatically delete print image data that has passed its expiration date/time from the HDD 17. Among such print image data, those corresponding to user data of a high degree of importance (rank 3) are not deleted from the HDD 17 until a prescribed time period passes since the expiration date/time. Thus, the information processing device 10 in this embodiment is capable of automatically and efficiently deleting the stored print image data from the HDD 17 at appropriate timings depending on the degrees of importance of the data so as to prevent the HDD 17 from accumulating excessive amounts of print image data.

Furthermore, since the name of the user performing the print operation can be printed on each document, other users seeing such an printed document left in the output tray of the printing device 5 can easily recognize the recipient of the printed document (i.e. to which user the printed document should be delivered), by which the printed document is prevented from being left in the output tray for a long time.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

For example, while the aforementioned functions of the print control device in accordance with the present invention were installed in each information processing device 10 in the above embodiment, the functions of the print control device may also be implemented by a microcomputer of the printing device 5, for example. In other words, it is possible to make the microcomputer of the printing device 5 control the built-in printing unit of the printing device 5 so as to print the expiration date/time, etc. on each sheet according to the method of the present invention.

While whether the printing of the expiration date/time is necessary or not can be arbitrarily switched (selected) by the user in the above embodiment, the information processing device 10 (print utility program) may also be configured to necessarily or automatically instruct the printing device 5 to carry out the printing of the expiration date/time on each sheet.

While the information processing device 10 in the above embodiment acquires the expiration date/time information from the print setting dialog each time (letting the user arbitrarily set the expiration date/time on each printing of the expiration date/time), the expiration date/time may also be automatically fixed at a date/time that is a prescribed time period after the current date/time. In other words, the information processing device 10 may also be configured to automatically acquire the expiration date/time to be printed on the sheet by adding the prescribed time period to the current date/time.

According to the above-described embodiment, the user is allowed to easily order the printing device to execute the reprinting of previously-printed data (that has once been printed out by the printing device) through the list screen, which is particularly convenient for the user. Especially when the printing device is shared by two or more users, a user can erroneously take out other user's printed document (printout) from the output tray of the printing device. With the print control device having the reprint function, a printed document that has been taken away by another user can be obtained again from the printing device with ease.

What is claimed is:

1. A print control device for controlling a printing device, comprising:
    a processing unit configured to control the printing device to print an image corresponding to print target data on a recording medium when print target data is specified; and
    memory having machine readable instructions stored thereon that, when executed by the processing unit, cause the print control device to:

acquire information on a time to be printed on the recording medium as an expiration date/time of a printed document;

control the printing device to print an image including the expiration date/time of the printed document on the recording medium, on which the image corresponding to the specified print target data is printed, based on the information acquired when the printing device is caused to execute the printing of the image corresponding to the specified print target data;

generate print image data, in which the image representing the expiration date/time of the printed document is laid out together with the image corresponding to the specified print target data, based on the information acquired when the print target data is specified;

supply the generated print image data to the printing device to cause the printing device to print an image corresponding to the generated print image data on the recording medium;

store the generated print image data in a storage device when the processing unit causes the printing device to execute the printing of the image corresponding to the generated print image data;

determine whether the expiration date/time printed on the recording medium has passed;

when determining that the expiration date/time on the recording medium has passed, delete print image data, which corresponds to the printed image including the determined expiration date/time of the recording medium, from the print image data that has been stored in the storage device; and when determining that the expiration date/time on the recording medium has not passed, maintain the print image data which is stored in the storage device and corresponds to the printed image including the determined expiration date/time of the recording medium.

2. The print control device according to claim 1, wherein the memory has further instructions stored thereon that, when executed by the processing unit, cause the print control device to:

display a list screen indicating a list of pieces of the print image data which have been stored in the storage device, the list screen being configured as a graphical user interface that is enabled to receive a user's reprint operation regarding each piece of print image data, on a display device when a display instruction is inputted through a user interface;

receive the reprint operation performed by the user on the list screen through the user interface;

read out the piece of print image data as the target of the reprint operation from the storage device in response to the reprint operation;

supply the print image data to the printing device; and cause the printing device to print an image corresponding to the print image data on a recording medium.

3. The print control device according to claim 2, wherein the memory has further instructions stored thereon that, when executed by the processing unit, cause the print control device to:

display the list screen on the display device as a screen enabled to receive a user's preview operation regarding each piece of print image data, and display a preview screen, indicating an image corresponding to the print image data as the target of the preview operation, on the display device when the preview operation is performed by the user on the list screen through the user interface.

4. The print control device according to claim 2, wherein the memory has further instructions stored thereon that, when executed by the processing unit, cause the print control device to:

acquire information specifying degree of importance of the printed document through the user interface.

5. The print control device according to claim 2, wherein the memory has further instructions stored thereon that, when executed by the processing unit, cause the print control device to:

acquire information specifying degree of importance of the printed document through the user interface, and generate print image data, in which an image representing the expiration date/time and the degree of importance of the printed document is laid out together with the image corresponding to the specified print target data, based on the information acquired when the print target data is specified, and supply the generated print image data to the printing device to cause the printing device to print an image corresponding to the generated print image data on the recording medium.

6. The print control device according to claim 1, wherein the memory has further instructions stored thereon that, when executed by the processing unit, cause the print control device to:

cause the printing device to print information related to a user who has specified the print target data on the recording medium printed with the image corresponding to the specified print target data when the processing unit causes the printing device to execute the printing of the image corresponding to the specified print target data.

7. The print control device of claim 1, further comprising an operation unit that allows a user to input the information on the time to be printed on the recording medium as the expiration date/time of the printed document and information specifying the degree of importance of the printed document when the print target data is specified.

8. The print control device of claim 1, wherein the memory has further instructions stored thereon that, when executed by the processing unit, cause the print control device to:

acquire information specifying a rank of the printed document when the print target data is specified; and suspend the deletion of the print image data that has passed the expiration date/time until a prescribed time period passes since the expiration date/time when a degree of importance regarding the print image data satisfies a prescribed condition.

9. The print control device of claim 8, wherein the degree of importance of the printed document corresponds to the rank of the printed document and the prescribed condition is satisfied when the rank of the printed document exceeds the predetermined value.

10. A non-transitory computer-readable recording medium storing computer-readable instructions that, when executed by a computer, cause the computer to implement:

an acquiring function of acquiring information on a time to be printed on a recording medium as an expiration date/time of a printed document;

a print control function of causing a printing device to print an image corresponding to print target data on the recording medium when print target data is specified, while causing the printing device to print an image including the expiration date/time of the printed document on the recording medium printed with the image corresponding to the specified print target data based on the information acquired by the acquiring function, wherein the print control function generates print image data, in which the image representing the expiration date/time of the printed document is laid out together with the image corresponding to the specified print target data, based on the information acquired by the acquiring function when the print target data is specified, supplies the generated print image data to the printing device, and causes the printing device to print an image corresponding to the generated print image data on the recording medium;

a data storing function of storing the print image data generated by the print control function in a storage device when the print control function causes the printing device to execute the printing of the image corresponding to the generated print image data;

a determining function of determining whether the expiration date/time printed on the recording medium has passed;

a data deletion function of deleting print image data, which corresponds to the printed image including the determined expiration date/time of the recording medium, from the print image data that have been stored in the storage device by the data storing function when determining that the expiration date/time on the recording medium has passed; and a data maintaining function of maintaining the print image data, which is stored in the storage device and corresponds to the printed image including the determined expiration date/time of the recording medium, when determining that the expiration date/time on the recording medium has not passed.

11. The non-transitory computer-readable recording medium according to claim 10, further storing computer-readable instructions that, when executed by the computer, cause the computer to implement:

a list screen displaying function of displaying a list screen, indicating a list of the print image data which have been stored in the storage device by the data storing function and being configured as a graphical user interface that is enabled to receive a user's reprint operation regarding each piece of print image data, on a display device when a display instruction is inputted through a user interface; and a reprint function of receiving the reprint operation performed by the user on the list screen through the user interface, reading out a piece of print image data as the target of the reprint operation from the storage device in response to the reprint operation, supplying the print image data to the printing device, and causing the printing device to print an image corresponding to the print image data on a recording medium.

12. The non-transitory computer-readable recording medium according to claim 11, wherein:

the list screen displaying function displays the list screen on the display device as a screen enabled to receive a user's preview operation regarding each piece of print image data, and the computer-readable recording medium further stores computer-readable instructions that, when executed by the computer, cause the computer to implement a preview function of displaying a preview screen, indicating an image corresponding to the print image data as the target of the preview operation, on the display device when the preview operation is performed by the user on the list screen through the user interface.

13. The non-transitory computer-readable recording medium according to claim 11, further storing computer-readable instructions that, when executed by the computer, cause the computer to implement the acquiring function of acquiring the information specifying degree of importance of the printed document through the user interface, wherein:

the print control function generates print image data, in which an image representing the expiration date/time and the degree of importance of the printed document is laid out together with the image corresponding to the specified print target data, based on the information acquired when the print target data is specified, and supplies the generated print image data to the printing device, to cause the printing device to print an image corresponding to the generated print image data on the recording medium.

14. The non-transitory computer-readable recording medium according to claim 10, wherein the print control function causes the printing device to print information related to a user who has specified the print target data on the recording medium printed with the image corresponding to the specified print target data when the print control function causes the printing device to execute the printing of the image corresponding to the specified print target data.

15. The non-transitory computer-readable recording medium according to claim 10, further storing computer-readable instructions that, when executed by the computer, cause the computer to implement:

an importance information acquiring function of acquiring information specifying degree of importance of the printed document, wherein the data deletion function suspends the deletion of the print image data that has passed the expiration date/time until a prescribed time period passes since the expiration date/time when the degree of importance regarding the print image data satisfies a prescribed condition.

16. The non-transitory computer-readable recording medium according of claim 15, wherein the degree of importance of the printed document corresponds to a rank of the printed document and the prescribed condition is satisfied when the rank of the printed document exceeds the predetermined value.

17. A print control method for controlling a printing device, comprising the steps of:

acquiring information on a time to be printed on a recording medium as an expiration date/time of a printed document; and controlling the printing device to print an image corresponding to print target data on the recording medium when print target data is specified;

controlling the printing device to print an image representing the expiration date/time of the printed document on the recording medium printed with the image corresponding to the specified print target data based on the information acquired in the acquiring step when the printing device is caused to execute the printing of the image corresponding to the specified print target data;

generating print image data, in which the image representing the expiration date/time of the printed document is laid out together with the image corresponding to the specified print target data, based on the information acquired in the acquiring step when the print target data is specified;

supplying the generated print image data to the printing device to cause the printing device to print an image corresponding to the generated print image data on the recording medium;

storing the generated print image data in a storage device when the printing device is caused to execute the printing of the image corresponding to the generated print image data;

determining whether the expiration date/time printed on the recording medium has passed;

when determining that the expiration date/time on the recording medium has passed, deleting print image data, which corresponds to the printed image including the determined expiration date/time of the recording medium, from the print image data that has been stored in the storage device in the storing step; and when determining that the expiration date/time on the recording medium has not passed, maintaining the print image data which is stored in the storage device and corresponds to the printed image including the determined expiration date/time of the recording medium.

18. The print control method of claim 17, further comprising the steps of:

acquiring information specifying degree of importance of the printed document; and suspending the deletion of the print image data that has passed the expiration date/time until a prescribed time period passes since the expiration date/time when the degree of importance regarding the print image data satisfies a prescribed condition.

19. The print control method of claim 18, wherein the degree of importance of the printed document corresponds to a rank of the printed document and the prescribed condition is satisfied when the rank of the printed document exceeds the predetermined value.

* * * * *